INVENTORS:
JULIUS L. ENGLESBERG
ALFRED KRELL
BY WALTER OTTO

Breitenfeld & Levine
ATTORNEYS

United States Patent Office 3,420,184
Patented Jan. 7, 1969

3,420,184
PUMP EMPLOYING MAGNETIC DRIVE
Julius L. Englesberg, 123 Knollwood Road, Rockville Centre, N.Y. 11570, Alfred Krell, North Bellmore, and Walter J. Otto, Wantaugh, N.Y.; said Krell and said Otto assignors to said Englesberg
Filed May 17, 1967, Ser. No. 639,201
U.S. Cl. 103—87                               5 Claims
Int. Cl. F04d *13/02;* H02k *49/10*

ABSTRACT OF THE DISCLOSURE

Pump impeller mounted on shaft which carries a permanent disk magnet. Latter magnetically coupled to a disk magnet carried by a motor shaft. Impeller shaft, rotatable within a sleeve bearing, provided with an external spiral groove terminating at interface between bearing end and impeller hub. A portion of the liquid being pumped is led into the spiral groove and pumped through groove to interface. The liquid flows radially outwardly between interface and counteracts force on impeller shaft produced by attraction between the magnets. Notched washer preferably used between bearing end face and impeller hub.

---

This invention relates to pumps, and more particularly to pumps in which a magnetic coupling is employed between the driving motor shaft and the pump impeller.

In such pumps, it is known to employ within a pump housing an impeller connected to a disk-shaped magnet, the housing being completely closed except for the liquid inlet and outlet ports. The wall of the pump housing adjacent to the magnet is usually formed of a thin membrane parallel to the face of the magnet, and a second disk-shaped magnet, mounted on a motor shaft, is arranged outside the pump housing with its face adjacent and parallel to the membrane. There is a strong force of attraction between the magnets, producing a magnetic coupling, and consequently when the motor shaft rotates, the pump impeller rotates with it.

Although the use of a magnetic coupling, as described, avoids the problems associated with providing a liquid tight seal around a rotating drive shaft extending through a wall of the pump housing, the magnetic coupling does present a significant problem. Specifically, the strong attractive force between the magnets produces an unbalanced force, in an axial direction, on the impeller. Unless this force is counterbalanced, severe wear to the pump parts results. Various schemes have been suggested in the past for counterbalancing the magnetic force on the impeller. One suggestion has been to employ a second pair of magnets arranged to produce a force on the impeller in a direction opposite to the force engendered by the magnetic coupling. This arrangement, however, involves the expense of an extra pair of magnets. It has also been suggested to employ the hydraulic force of the pumped liquid to counterbalance the magnetic force on the impeller. However, these arrangements have not proved satisfactory, especially in larger size pumps, due to their inability to apply the hydraulic force uniformly and consistently to the impeller.

It is therefore an object of this invention to provide a centrifugal pump having a magnetic drive comprising two disk-shaped magnets, wherein a hydraulic force is employed to uniformly and consistently counterbalance the axial thrust on the pump impeller produced by the attractive force between the magnets.

It is another object of the invention to provide such a pump wherein the hydraulic force is provided by the liquid being pumped.

It is a further object of the invention to provide such a pump wherein the impeller is supported in sturdy fashion on a shaft which is rotatably supported by the pump housing.

These and other objectives are achieved according to the present invention by providing a shaft rotatably supported about its longitudinal axis within a bearing mounted in the pump body. The shaft carries an impeller at one end and a magnet at the other, the magnet being part of a magnetic coupling, as described above. The region of the pump body defining the impeller cavity is separated from the region defining the magnet-containing cavity by a wall, the shaft extending through this wall. A passageway in the wall directs a portion of the liquid pumped by the impeller into the magnet cavity, and from here the liquid flows into a spiral groove provided between the shaft and its bearing. The liquid is pumped through the groove toward the impeller, as the shaft rotates, and exits by flowing in a radial direction between the end face of the bearing and the opposed face of the impeller hub or a washer overlying the hub. Thus, the continuous and steady liquid flow through the spiral groove results in a uniform pressurized film between the bearing end face and the impeller hub which produces a force on the impeller to counterbalance the force of the magnetic coupling.

Other features and advantages of the invention will be apparent from the following detailed description in which reference is made to the accompanying drawings.

Figure 1:
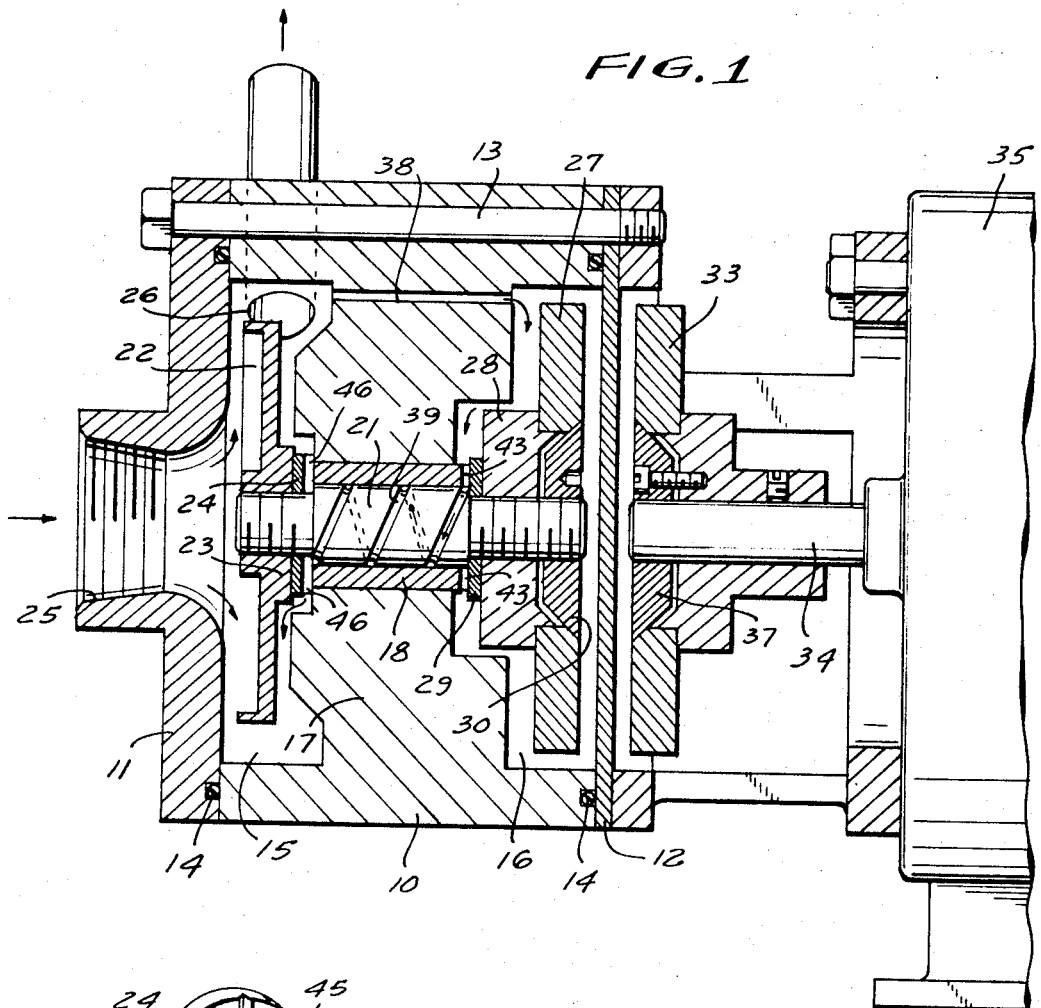
FIG. 1 is a vertical cross-sectional view through the centerline of a pump according to this invention.

The pump chosen to illustrate this invention includes a pump body comprising a cylindrical central section 10, an end plate 11, and a membrane 12, secured together by bolts 13. O-rings 14 provide liquid tight seals between the pump body sections 10–12. The central body section 10 is formed at one end to define, together with the end plate 11, an impeller cavity 15, and its other end is formed to define, together with membrane 12, a magnet cavity 16. Between the cavities 15 and 16, the body section 10 constitutes a wall 17 separating the two cavities. At the center of the wall 17 is a bore lined by sleeve bearing 18, the bearing being non-rotatable with respect to the body.

Rotatably arranged within the bearing 18 is a shaft 21, the ends of which extend into the cavities 15 and 16. Mounted on one end of the shaft 21 is an impeller 22. The impeller has a central hub portion 23 formed with an internally threaded hole which engages the external threads on the shaft end. A washer 24 is located between the impeller hub 23 and the bearing 18. When the shaft 21 is rotated it rotates the impeller 22, with the result that the liquid flows into the impeller cavity 15 through the inlet port 25 formed in the end plate 11, and out through the outlet port 26 formed in the body section 10.

Mounted on the other end of the shaft 21 is an annular disk-shaped magnet 27. The magnet 27 is supported by a support member 28 which is slipped over the shaft end, a washer 29 being located between the support member and the bearing 18. After the magnet 27 is placed against the support member 28, a frusto-conically shaped nut 30 is threaded on to the shaft end and tightly presses the magnet 27 against the support member 28. One of the inner edges of the magnet is beveled, as shown, to form a seat for the tapered surface of the nut 30.

Adjacent to the outer face of the membrane 12 is a second annular disk-shaped magnet 33 secured to the output shaft 34 of a motor 35. A support member 36 is fixed to the shaft 34, and the magnet 33 is held in place on the support member by a frusto-conical shaped holder 37 secured to the support member by screws. One inner edge of the magnet 33 is beveled to form a seat for the tapered surface of the holder 37.

The membrane 12 is fabricated of non-magnetic material, and its thickness has been exaggerated in the drawings. Consequently, the magnets 27 and 33 are in practice spaced apart by a very small gap. The magnets may be magnetized with a pattern of radially-extending alternate north and south poles. As a result, sufficient magnetic flux couples the magnets so that the motor shaft 34 rotates and thereby rotates magnet 33, magnet 27 will be rotated via the magnetic flux and causes the shaft 21 and impeller 22 to be rotated.

As the impeller rotates, pressure builds up outwardly along its radius until it reaches the outlet pressure of the pump at the outer edge of the impeller. At the outer edge of the impeller cavity 15, a hole or passageway 38 extends between the cavities 15 and 16. Due to the relatively high pressure at the impeller cavity end of the hole, a portion of the liquid being pumped flows through the hole 38 into the magnet cavity 16, rather than to the outlet port 26. It should be mentioned that for the purposes of this invention, the hole 38 need not necessarily be at the outer edge of the impeller cavity 15. The hole could be moved radially inwardly, in which case the pressure of the liquid entering the hole would be lower and hence the volume of liquid flowing into cavity 16 would be reduced.

Figure 3:
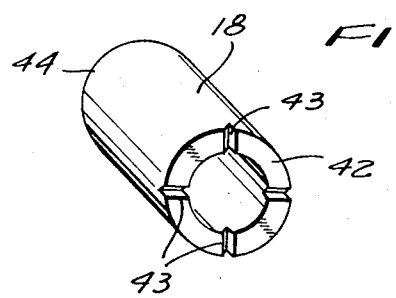
FIG. 3 is a perspective view of the shaft bearing.

After liquid enters the cavity 16, it flows toward a low pressure region created at the end of a spiral groove 39 formed in the outer surface of the shaft 21. To permit liquid to enter the groove 39, the end face 42 (FIG. 3) of the bearing 18 is provided with notches 43 so that liquid is free to flow through the notches 43 between the bearing and the washer 29.

Figure 2:
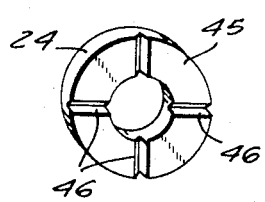
FIG. 2 is a perspective view of a washer which may be located between the bearing end face and the impeller hub.

The groove 39 is so arranged with respect to the direction of rotation of the shaft 21 that it functions as a screw pump and forces liquid along the shaft toward the impeller 22. When liquid reaches the outlet end of the groove 39, it flows radially outwardly into the relatively low pressure region of the impeller cavity adjacent to the impeller hub 23. This flow takes place between the end face 44 (FIG. 3) of the bearing 18 and the opposite face 45 (FIG. 2) of the washer 24. To facilitate this flow, the face 45 of the washer 24 is provided with notches 46. Thus, a hydraulic pressure is created between the face 44 of the bearing and the face 45 of the washer 24. Whereas the force of attraction between the magnets 27 and 33 tends to pull the shaft 21 and impeller 22 toward the right in FIG. 1, the hydraulic force between the bearing 18 and washer 24 tends to push the shaft and impeller toward the left, and thereby counterbalances the magnetic force on the impeller and shaft.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A pump for liquids comprising an impeller, a rotatable shaft supporting asid impeller, two magnetically coupled disks, one of said disks being mounted on said shaft, means for rotating the other of said disks whereby as said other disk rotates it causes said one disk and hence said shaft and impeller to rotate, said magnetic disks being attracted to each other thereby producing a force on said shaft tending to move it longitudinally, and means for providing a pressurized portion of the liquid being pumped for effecting a longitudinal force on said shaft to counterbalance said magnetic force on said shaft.

2. A pump as defined in claim 1 including a bearing within which said shaft rotates, said bearing having an end face facing said impeller, and means on said shaft presenting a face opposing said bearing end face, and wherein said last-named means provides a portion of the liquid being pumped between said faces.

3. A pump as defined in claim 2 wherein said last-named means includes a spiral groove between said bearing and shaft through which liquid is pushed toward said impeller as said shaft rotates.

4. A pump as defined in claim 3 including a pump housing, an impeller cavity and a magnet cavity within said housing, and means for directing a portion of the liquid pressurized by said impeller from the impeller cavity to the magnet cavity, said liquid portion thereupon flowing into said spiral groove.

5. A pump as defined in claim 4 including a wall between said impeller cavity and magnet region, said directing means being a hole in said wall.

References Cited
UNITED STATES PATENTS

| | | | |
|---|---|---|---|
| 2,638,558 | 5/1953 | Rankin | 103—87 |
| 3,107,310 | 10/1963 | Carriere et al. | 310—103 |

ROBERT M. WALKER, *Primary Examiner.*

U.S. Cl. X.R.

310—104; 103—103